United States Patent [19]
Vasselin et al.

[11] Patent Number: 5,506,310
[45] Date of Patent: Apr. 9, 1996

[54] ADHESIVE FILM COMPOSITION

[75] Inventors: Thierry Vasselin, Evreux; Michel Vuachet, Bron; Gilles Recher, Marcq en Bareuil, all of France

[73] Assignee: Elf Atochem S.A., Paris-La-Defense, France

[21] Appl. No.: 255,973

[22] Filed: Jun. 8, 1994

Related U.S. Application Data

[60] Division of Ser. No. 714,183, Jun. 14, 1991, Pat. No. 5,348,804, and a continuation-in-part of Ser. No. 708,016, Jun. 3, 1991, abandoned, and Ser. No. 708,017, Jun. 3, 1991.

[30] Foreign Application Priority Data

Jun. 14, 1990 [FR] France ................... 90 07420
Jun. 14, 1990 [FR] France ................... 90 07600

[51] Int. Cl.$^6$ ........................... C08F 283/04
[52] U.S. Cl. ........................ 525/426; 525/420
[58] Field of Search ..................... 525/418, 420, 525/426

[56] References Cited

U.S. PATENT DOCUMENTS

| | | | |
|---|---|---|---|
| 4,230,838 | 10/1980 | Foy et al. | 525/408 |
| 4,252,920 | 2/1981 | Deleens et al. | 525/430 |
| 4,332,920 | 6/1982 | Foy et al. | 525/408 |
| 4,661,401 | 4/1987 | Akao | 428/215 |
| 4,690,856 | 9/1987 | Ito et al. | 428/215 |
| 4,953,884 | 9/1990 | Diard et al. | 280/609 |
| 4,953,885 | 9/1990 | Comert et al. | 280/610 |
| 4,961,592 | 10/1990 | Diard et al. | 280/609 |
| 4,993,740 | 2/1991 | Recher et al. | 280/610 |
| 5,000,475 | 3/1991 | Gagneux et al. | 280/602 |
| 5,002,300 | 3/1991 | Pascal et al. | 280/602 |
| 5,002,301 | 3/1991 | Gagneux et al. | 280/602 |

FOREIGN PATENT DOCUMENTS

| | | | |
|---|---|---|---|
| 0312968 | 4/1989 | European Pat. Off. | A63C 5/12 |
| 0328439 | 8/1989 | European Pat. Off. | A63C 5/12 |
| 2523143 | 9/1983 | France | C08L 23/08 |
| 2553290 | 4/1985 | France | A63C 5/12 |
| 2596286 | 10/1987 | France | A63C 5/04 |
| 3003537 | 8/1980 | Germany | A63C 5/12 |
| 62-84141 | 4/1987 | Japan | C08L 51/06 |
| 1-163234 | 6/1989 | Japan | C08L 23/02 |

*Primary Examiner*—Christopher W. Raimund
*Attorney, Agent, or Firm*—Greenblum & Bernstein

[57] ABSTRACT

A thermoplastic film, adapted for adhesion, composed of a compound of polyamide-based thermoplastic elastomers and of copolymers of olefins, the latter preferably being constituted of at least two different monomers of olefins. The composition of the thermoplastic film is such that the thermoplastic elastomers represent at least 50% and preferably 60% of the total weight of the compound.

8 Claims, 2 Drawing Sheets

5,506,310

ADHESIVE FILM COMPOSITION

RELATED APPLICATIONS

This application is a continuation-in-part of U.S. patent applications Ser. No. 07/708,016, now abandoned, and Ser. No. 07/708,017, pending, both filed Jun. 3, 1991, in the names of Thierry VASSELIN, Michel VUACHET, Gilles RECHER, and Myriam SERVES, claiming priority of French Application No. 90 07,044 filed Jun. 1, 1990, and French Application No. 90 06,869 filed on Jun. 1, 1990, the disclosures of which are hereby incorporated in their entireties by reference thereto herein.

This application is also a division of application Ser. No. 07/714,183, filed on Jun. 14, 1991, now U.S. Pat. No. 5,348,804.

This application also claims the priority of French Application No. 90 07,600 filed Jun. 14, 1990 and French Application No. 90 07,420 filed Jun. 14, 1990, the disclosures of which we hereby incorporated in their entireties by reference thereto herein.

FIELD OF THE INVENTION

The present invention relates to thermoplastic materials used as films adapted for adhesion which are composed of a thermoplastic elastomer (TPE) comprising a polyamide and of copolymers of modified olefins, as well as processes for adhesion of elements of an article of manufacture, such as a ski structure, using such thermoplastic materials and films.

DISCUSSION OF BACKGROUND AND MATERIAL INFORMATION

In the field of the plastic films, "hot melt" films are well known. French Patent No. FR 2,523,143 describes an adhesive whose composition contains at least about 35% by weight ethylene based copolymers, at least one vinylic ester, and from 0.5 to 20% of a copolyetheresteramide.

European Patent Application No. 312,968 describes the use of adhesive films of the "hot melt" type for the assembly of elements of a ski structure. These films are basically composed of a thermoplastic polymer and of an adhesion promoting agent, such as a silane or an epoxy resin.

SUMMARY OF THE PRESENT INVENTION

An object of the present invention is a film comprising a new composition, adapted for adhesion, which possesses improved adhesion properties, and may be applied to a variety of materials and elements, preferably in the production of an article of manufacture, such as a ski.

Another object of the invention is to improve the thermal retention of the adhesion of elements of a structure, such as a ski, that is formed using the adhesive film of the thermoplastic materials of the present invention.

An advantage of the films of thermoplastic materials of the present invention is that they are more economical to manufacture and implement when compared to currently known films.

The present invention relates to films or sheets of thermoplastic material, adapted for adhesion, having a composition comprising at least one thermoplastic elastomer (TPE) based on polyamides and a copolymer of modified olefins.

The present invention is directed to a process for assembling elements of a ski structure which involves adhering a first element having a junction surface to at least a second element having a Junction surface by placing at least one adhesive layer between junction surfaces of the first element and the second element, and placing at least one thermoplastic film having a composition comprising a polyamide based thermoplastic elastomer and a copolymer of modified olefins between said adhesive layer and the junction surface of said first element to result in a ski structure.

The present invention is also directed to a ski structure which is composed of at least a first element having a junction surface; a thermoplastic film laving a composition comprising a polyamide based thermoplastic elastomer and a copolymer of modified olefins placed on the junction surface; an adhesive layer applied to the thermoplastic film; and at least a second element having a Junction surface adhered to the adhesive layer.

For purposes of the processes and resultant structures, such as skis, of the present invention the copolymer of modified olefins preferably includes either at least one member selected from the group consisting of olefin monomers, or at least one comonomer selected from the group consisting of vinylic esters of saturated carboxylic acids, saturated mono-carboxylic acids, saturated di-carboxylic acids, esters of saturated mono-carboxylic acids, esters of saturated di-carboxylic acids, salts of saturated mono-carboxylic acids, salts of saturated di-carboxylic acids, anhydrides of saturated di-carboxylic acids, and anhydrides of unsaturated di-carboxylic acid. Preferably, the copolymer of modified olefins is an ethylene-propylene grafted copolymer.

In accordance with the present invention, the thermoplastic elastomer includes at least about 50% by weight of the composition, and preferably at least about 60% by weight of said composition. For the purposes of the present invention the ethylene propylene grafted copolymer may be grafted by a member selected from the group consisting of carboxylic acid, an anhydride of carboxylic acid, and a salt of carboxylic acid. Preferably, the copolymer includes at least two monomers of different olefins, and more preferably the copolymer is selected from the group consisting of maleic ethylene and propylene dienes, and maleic ethylene and propylene rubbers, such as a maleic ethylene and propylene diene, or a maleic ethylene and propylene rubber, wherein the maleic ethylene and propylene rubber comprises between about 0.1% to about 2% by weight maleic anhydride.

For the purpose of the present invention, the copolymer of modified olefins may include at least one modified copolyolefin selected from the group consisting of statistical copolymers and sequenced copolymers, wherein the copolyolefins comprise at least one member selected from the group consisting of i) at least two monomers of different olefins, and ii) at least one comonomer selected from the group consisting of vinylic esters of saturated carboxylic acid, saturated mono-carboxylic acids, saturated di-carboxylic acids, esters of saturated mono-carboxylic acids, esters of saturated di-carboxylic acids, salts of saturated mono-carboxylic acids, salts of saturated di-carboxylic acids, anhydrides of saturated di-carboxylic acids, and anhydrides of unsaturated di-carboxylic acids, wherein said olefins represent at least 50% of the total weight of said copolymer, and preferably comprise at least 60% by total weight of said copolymer, and wherein the weighted ratio of $$\frac{\text{polyamide based thermoplastic elastomer}}{\text{polyamide and modified copolyolefin based thermoplastic elastomer}}$$

is greater than about 50%, and preferably is greater than about 60%.

In accordance with the present invention, the polyamide based thermoplastic elastomer includes a copolymer selected from the group consisting of statistical copolymers and sequenced copolymers, wherein the sequenced copolymers comprise polyetheresteramides, and the polyetheresteramides comprise sequenced polyamides having an average molecular weight of between about 500 and about 10,000, and preferably between about 600 and about 5,000, and wherein the polyetheresteramides comprise polyethers which have an average molecular weight of between about 200 and about 6,000, and preferably between about 600 and about 3,000.

For purposes of the present invention, the adhesive layer may include a material selected from the group consisting of resin and a foam, wherein the thermoplastic film is interspersed between the adhesive layer and the junction surface. Preferably, the adhesive layer includes a member selected from the group consisting of epoxy adhesives, polyester adhesives, and polyurethane adhesives, wherein the adhesive layer and the second element comprise a preimpregnated, partially cross-linked assembly. The junction surface of the first element may include at least one member selected from the group consisting of polyamides, polyethylenes, polyethylene terephthalates, polybutadiene terephthalates, polypropylenes, aluminum, processed aluminum, steel, and metal alloys, and preferably a polyamide film. The first element is preferably an exterior element of a ski.

A process of the present invention also involves subjecting the ski structure to heat to cross-link the thermosettable adhesive.

For purposes of the present invention, the polyamide-based thermoplastic elastomer comprises a polyetheramide, preferably, wherein the polyetheramide comprises a polyetheresteramide. The modified copolyolefin may be selected from the group consisting of maleic ethylene and propylene rubbers, and maleic ethylene, propylene and diene copolymers.

For the purposes of the present invention the thermoplastic film may include at least one member selected from the group consisting of fillers, pigments, dyes, and additives, preferably wherein the fillers are present in amounts up to about 50% by weight and more preferably up to about 40% by weight of the polyamide-based thermoplastic elastomer and copolyolefin. The adhesive may be a thermosettable adhesive which is selected from the group consisting of epoxy resins, polyester resins, and polyurethane resins.

In accordance with the present invention, the thermosettable adhesive and the second element may comprise a pre-impregnated, partially cross-linked assembly. Also, the Junction surface of the first element may include at least one material selected from the group consisting of polyamide, polyethylene, polyethylene terephthalate, polybutadiene terephthalate, polypropylene, aluminum, processed aluminum, aluminum alloys, steel, and metal alloys, and preferably wherein the first element is a polyamide film. The first element may be a decorative element or a protective element for a ski.

A process of the present invention also involves placing the first element, the polyamide-based thermoplastic film and the second element in a mold, injecting an expandable polyurethane foam into the mold and permitting the polyurethane foam to harden and adhere to the polyamide-based thermoplastic film and the first element.

A process of the present invention also involves coextruding the first element and the polyamide film in a single step.

The present invention is also directed to a film adapted for adhesion, which includes at least one polyamide based thermoplastic elastomer; and at least one modified copolyolefin selected from the group consisting of statistical copolymers and sequenced copolymers, said copolyolefins comprising at least one member selected from the group consisting of i) at least two monomers of different olefins, and ii) at least one comonomer selected from the group consisting of vinylic esters of saturated carboxylic acid, saturated mono-carboxylic acids, saturated di-carboxylic acids, esters of saturated mono-carboxylic acids, esters of saturated di-carboxylic acids, salts of saturated mono-carboxylic acids, salts of saturated di-carboxylic acids, anhydrides of saturated di-carboxylic acids, and anhydrides of un saturated di-carboxylic acids, wherein said olefins represent at least 50% of the total weight of said copolymer, and preferably at least 60% by total weight of said copolymer, preferably wherein the weighted ratio of $$\frac{\text{polyamide based thermoplastic elastomer}}{\text{polyamide and modified copolyolefin based thermoplastic elastomer}}$$

is greater than about 50%, i.e., greater than about 60%.

A process of the present invention also involves assembling elements of a composite material by adhering at least one first element having a junction surface and a second element having a junction surface by placing an adhesive layer of a material selected from the group consisting of a resin and a foam between Junction surfaces of the first element and the second element, interspersing a thermoplastic film having a composition comprising polyamide based thermoplastic elastomer and a copolymer of modified olefins between the adhesive layer and the junction surfaces, preferably wherein the adhesive layer comprises epoxy adhesives, polyester adhesives, and polyurethane adhesives, and the adhesive layer and the second element comprise a pre-impregnated partially cross-linked assembly. The junction surface of said first element may comprise at least one member selected from the group consisting of polyamides, polyethylenes, polyethylene terephthalates, polybutadiene terephthalates, polypropylenes, aluminum, processed aluminum, aluminum alloy, steel, and metal alloys, and is preferably a polyamide film. The first element preferably comprises an upper element for decoration and protection of a wind surfer.

In accordance with the present invention, the first element and the polyamide film may be coextruded in a single step.

The process of the present invention may involve placing the first element, the thermoplastic film, and the second element in a mold, and injecting an expandable polyurethane foam into said mold and permitting the foam to expand, harden and adhere to the adhesive film and to the first element.

A process of the present invention also involves forming a thermoplastic film having a composition comprising a polyamide-based thermoplastic elastomer and a copolymer of modified olefins into a packaging material, such as sheaths and bags.

BRIEF DESCRIPTION OF THE DRAWINGS

Other objects, characteristics and advantages will become apparent from the description and the embodiments that follow, along with the annexed figures in which.

DETAILED DESCRIPTION

Figure 1:
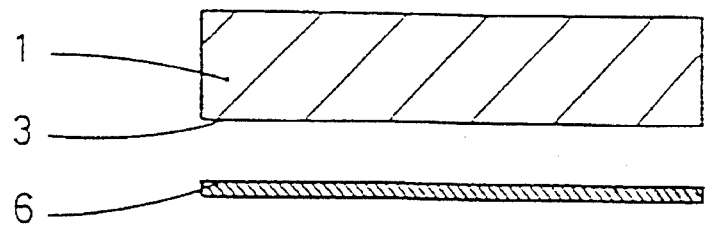
FIGS. 1–4 illustrate a process of assembly by adhesion according to a first embodiment of the invention.

The present invention relates to a film having a composition comprising of polyamide based thermoplastic elastomers and copolymers of modified olefins.

Preferably, the composition of the present invention comprises at least 50% and preferably at least 60% thermoplastic elastomer based on of the total weight of the composition.

The polyamide based thermoplastic elastomer component of the composition of the present invention may be statistical or sequenced copolymers.

The copolymers of the polyamide based thermoplastic elastomer of the composition of the present invention are formed by a random chain formation of the different components, e.g., monomers and/or prepolymers, while the sequence or block copolymers, which are preferred, are formed from blocks having a certain chain length of their diverse components.

These polyamide based copolymers are preferably selected from the group consisting of polyester amides and polyether amides.

The sequenced polyether amides or the block polyether amides essentially result from the copolycondensation of reactive end polyamide sequences with reactive end polyether sequences, representative examples of which are selected from the group consisting of:

a) polyamide sequences at the end of diamine chains with polyoxyalkylene sequences at the end of di-carboxylic chains;

b) polyamide sequences at the end of di-carboxylic chains with polyoxyalkylene sequences at the end of diamine chains obtained by cyanoethalation and hydrogenation of alpha, omega, dihydroxylic aliphatic polyoxyalkylene sequences referred to as polyetherdiols; and c) polyamide sequences at the end of di-carboxylic chains with polyetherdiols, referred to as polyetheresteramides, which are especially preferred.

The composition and the manufacture of such polyetheramides have been described in the French Patents 2,273,021 and 2,401,947 whose contents complement the present description, and their counterpart U.S. Pat. Nos. 4,230,838, and 4,332,920; and U.S. Pat. No. 4,252,920, respectively, the disclosures of which are hereby incorporated in their entireties by reference thereto herein.

The average molecular weight or mass in number of these polyamide sequences is generally between 500 and 10,000 and preferably between 600 and 5000.

The polyamide sequences of polyetheresteramides are formed preferably by at least one member selected from the group consisting of aliphatic polyamides, amorphous polyamides, mixtures of aliphatic polyamides and amorphous polyamides, and of copolyamides resulting from the polycondensation of their monomers.

The average molecular mass in number of polyethers is generally between 200 and 6,000, and more precisely between 600 and 3,000.

The polyether sequences preferred are selected from the group consisting of polytetramethylene glycol (PTMG), polyethylene glycol (PEG) and polypropylene glycol (PPG).

The inherent viscosity of polyetheresteramides is advantageously between about 0.8 and 2.05. The viscosity of polyetheresteramide is measured in metacresol at 22° C. with an initial concentration of 0.5 g of polymer for 100 g of metacresol.

The polyetheresteramides may be formed of from about 5 to about 85% by weight of polyether, from about 95% to about 5% by weight of polyamide, and preferably from about 30% to 85% by weight of polyether and from about 70% to about 15% by weight of polyamide.

The polyetheresteramides preferred are those whose polyamide sequences are selected from the group consisting of PA-11, 12 and/or 12.12.

When a composition with anti-static properties is desired, one preferably uses the polyetheresteramides whose polyether sequences are selected from the group consisting of polyethylene glycol (PEG).

The second component of the composition of the present invention is a copolymer of modified olefins.

The copolymers of modified olefins, also referred to herein as modified copolyolefins, include copolymers selected from the groups consisting of:

a) at least two monomers of different olefins; and b) at least one comonomer selected from among vinylic esters of saturated carboxylic acid, unsaturated mono- and di- carboxylic acids, esters of mono- and di-carboxylic acids, salts, saturated or unsaturated di-carboxylic acid anhydrides.

Preferably the copolymer of modified olefins comprises at least two different clef in monomers.

The olefins may represent at least about 50%, and preferably at least about 60%, of the total weight of the copolymer, it being understood that the copolymers of modified olefins used in accordance with the present invention may be polymerized in a statistical or sequenced manner, and may have a linear, or branched, structure.

The preferred copolymers include the copolymers selected from the group consisting of ethylene and of propylene grafted by a carboxylic acid, an anhydride of a carboxylic acid, and an acid salt, preferably of a carboxylic acid.

Among the acids, the preferred choices include members selected from the group consisting of unsaturated di-carboxylic acid, such as maleic acid, and fumaric acid.

The anhydrides and salts that are chosen are those that correspond to the above-identified acids.

Representative examples of copolymers of modified olefins include members selected from the group consisting of maleic ethylene propylene dienes (EPDM).

The copolymers of modified olefins may be polymerized in a statistical or sequenced fashion, and have either a linear or a branched structure, examples of which include members selected from the group consisting of:

maleic ethylene and propylene rubbers (EPRm), preferably between about containing 0.1 to 2% by weight of maleic anhydride; and maleic ethylene, propylene and diene copolymers (EPDMm).

The films or sheets particularly preferred for purposes of the present invention are composed of a composition comprising at least about 50% by weight, and preferably at least about 60% by weight, polyetheresteramide and of a propylene-ethylene copolymer containing about 0.1% to about 2% by weight of grafted maleic anhydride.

To the composition of the present invention described above, which is particularly useful when formed into a film, diverse other components can be incorporated, such as fillers, pigments, dyes, and other additives.

Examples of fillers include members selected from the group consisting of fiberglass, carbon, aramide, talc, silicon, china clay, glass fibers and beads, ceramics, metallic charges, salts and metallic oxides, such as aluminum powder, calcium and manganese carbonates, ferrite powder and titanium oxide. Generally, one can incorporate up to about 50% and preferably up to about 40% by weight of fillers with respect to the composition comprising thermoplastic elastomer and copolymers of modified olefin in accordance with the present invention.

Examples of additives include members selected from the group consisting of anti UV agents, demolding agents, and shock modifying agents.

In view of their simple implementation, their good mechanical properties (especially resistance to cold shocks, abrasion and resistance to tear), their dimensional stability between −20° C. and 60° C., their positive aging, as well as of their excellent aptitude for adhesion and decoration, the films composed of the composition of the present invention may be used alone or for the manufacture of complex or composite objects, such as duplicate molding of elements, coextruded films, laminates, and other structures of assembled elements, such as ski structure.

The films and sheets of thermoplastic elastomer composition of the present invention are obtained by any known process of extrusion, such as extrusion-flat calendaring, extrusion-coating with acrylic resin, or extrusion-blowing. In such cases, the extrusion temperature is generally between 190° C. and 250° C.

According to the *Modern Plastic Encyclopedia*, the term "film" is reserved for objects with planar section whose thickness is less than 250 μm, and the term "sheet" is reserved for objects with a greater thickness, and which can attain several millimeters. In all that follows, and for reasons of simplification, the terms can be used as substitutes for one another and simultaneously designate both films and sheets. The films according to the invention may be used "as is" but may also be used for the manufacture of multi-layer films, obtained for example, by coextruston, and by heat lamination.

Single layer films are particularly adapted for adhesion on fabrics and non-woven materials, and for covering natural or synthetic fibers with foam.

The multi-layer film especially preferred comprises a layer of material selected from the group consisting of aliphatic polyamide, examples of which are selected from the group consisting of PA-6, PA-6.6, PA-11, PA-12, PA-12.12, of amorphous polyamide, of polyamide based thermoplastic elastomer, and of copolymers of ethylene and vinylic alcohol (EVOH); and a film according to the present invention.

The films of the present invention may be adhered Onto rigid elements, and especially on metallic elements, such as cables and sheet metal, as well as on synthetic materials, examples of which are preferably selected from the group consisting of materials based on epoxy resin, polyesters and polyurethanes, or elements coated or impregnated with the preceding materials, i.e., an epoxy resin base, and/or polyesters and/or polyurethanes.

The process of manufacture of these composite materials is generally performed in two steps:

In the first step, the multilayer film is coextruded, and then in the second step, the multilayer film is heat glued from the side of the layer of the composition according to the invention onto the support made, for example, of synthetic material, for example, by heat forming or thermal forming.

These composite materials may be decorated using the method of transferring impressions of subliminal ink, and preferably using the processes described in the patent application FR 2,596,286. The decor of these materials may also be done according to other techniques, such as serigraphy, painting or polishing, heat transfer, tampography, ink jet, and laser marking.

The composite materials comprising the dual layer film described above and a support impregnated with at least one member selected from the group consisting of an epoxy resin, polyester, and polyurethane, which may ultimately be decorated, are particularly preferred for the manufacture of skis, particularly the upper cosmetic layer of skis, of wind surfers, of skate boards, of surf boards, of boat hulls, and decoration panels for lower body parts of automobiles, anti-noise laminates, and thermal insulations.

Single layer films can also be used as bonds for coextrusion of multilayer films, particularly multilayer films whose adhesion is difficult, thus enabling those layers to be glued together.

As examples, film compositions according to the present invention may be used as coextrusion bonds for a polycarbonate (PC) based film and for an ethylene and vinylic alcohol (EVOH) based films.

These single or multilayer films of the present invention are particularly adapted to the manufacture of complex foams and fabrics according to the technique known as "foam baking".

In a laminating machine, at least one assembly composed of a piece of fabric, of a film according to the present invention, and possibly of a layer of foam, is superposed one on top of the other, and then the complex described above is heat laminated.

After cooling, the complex is positioned in a mold and injected with thermosettable or thermohardenable foam, for example, of the polyurethane type. The in situ expansion reaction of the components of the foam brings about the adhesion of the complex on the foam.

The presence of the film of the present invention between the piece of fabric and the foam is particularly advantageous because it stops the penetration of the foam through the fabric. Such composites are especially adapted for the manufacture of seats, especially car seats, as well as for isothermic combinations.

The present invention also relates to processes of adhesion of a film according to the invention for the manufacture of a composite material manufactured by the assembly of several elements coated or impregnated with a thermosettable adhesive of the epoxy and/or polyester type, or, for example, of a polyurethane foam. Although this adhesive must be compatible with all the elements to be assembled, these bonds do not generally suffice for the adhesion of all the elements that one may wish to use for this purpose. In order to obtain the adhesion of certain elements, therefore, it is proposed to use the thermoplastic adhesive films of the present invention.

This process of manufacture of composite materials accordance with the present invention comprises an assembly step of at least one first element and a second element by the action of a layer of a resin adhesive or of a foam between the junction surfaces of the two elements, and is characterized by the fact that at least one thermoplastic adhesive film of the present invention is interspersed between the adhesive layer and the junction surface of the first element.

The present invention also is directed to processes for the manufacture of skis, preferably skis used for winter sports, but also summer sport skis, such as water skis, jet skis, wind surfer skis, and surf skis or boards, and most especially for the adhesion of the various elements of the ski structure, and of the ski obtained according to this process.

The composite character of a ski structure leads to the ski being manufactured by assembly of separate elements that have previously been impregnated or coated with thermo-hardenable adhesives, for example, of the epoxy, polyester or polyurethane foam type. This adhesive should be compatible with all elements of the ski that are to be assembled, however, these bonds are not generally efficient to permit all the various materials to be glued together that one wishes to use in the manufacture and composition of the ski. Therefore, ill accordance with the present invention, it is proposed to use thermoplastic adhesive films of the present invention in order to obtain adhesion on certain materials.

This manufacturing process of a composite structure, such as a ski, comprises of an assembly step of at least a first element and a second or another element by the action of a resin adhesive layer or a foam between the Junction surfaces of the elements. This assembly step is characterized by the fact that a thermoplastic adhesive film is positioned between the adhesive layer and the Junction surface of the first element.

In the embodiments represented in FIGS. 1–4, there is shown an assembly of a first element 1 and of a second element 2, at their respective junction surfaces 3 and 4, via an adhesive layer 5 positioned between the junction surfaces 3 and 4. As shown, the second element 2 is compatible with the adhesive 5, that is the adhesive 5 has a good adhesive power with respect to element 2. However, in the embodiment shown, the first element 1 is made of a material that is not compatible with adhesive 5, that is, the adhesive 5 does not have a good adhesive power at the junction surface 3 of first element 1.

Therefore, in order to effect the assembly of a first element 1 with the second element 2, the first element 1 not having good adhesion with adhesive 5, a film 6 composed of a compound according to the present invention as described above, that is, a compound of polyamide based thermoplastic elastomer(s) and of copolymers of modified olefin(s), is positioned between the adhesive layer 5 and the junction surface 3 of the first element 1. Preferably, the compound of the present invention is such that the thermoplastic elastomer(s) represent at least about 50% of the total weight of the compound as has been defined.

Figure 2:
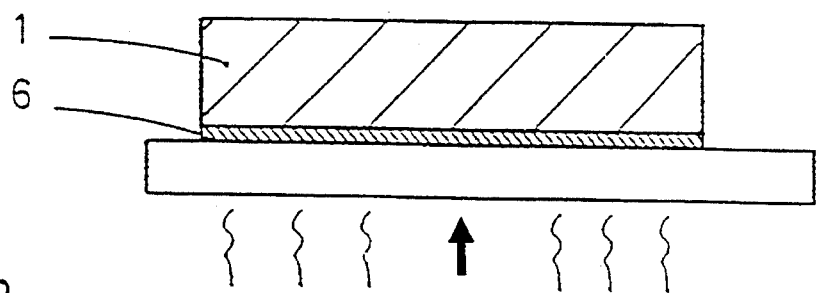
Figure 3:
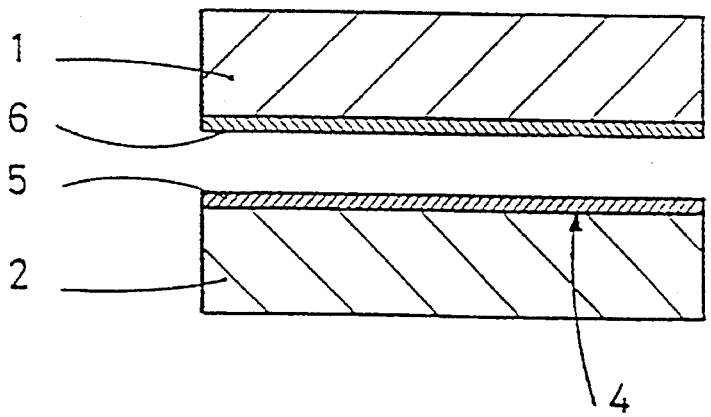
Figure 4:
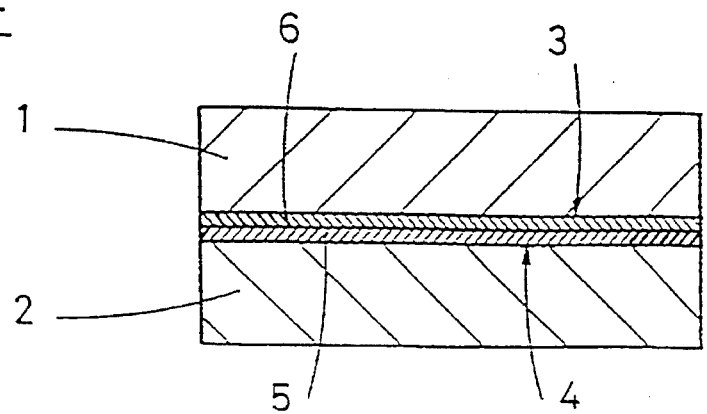

Insofar as the presence of adhesive 5 is concerned, one embodiment of a process in accordance with the present invention for the manufacture of a composite structure represented in FIGS. 1–4 involves coating the junction surface 4 of the second element 2 with the adhesive 5, as is represented in FIG. 3, before assembling elements 1 and 2 together by pressing the adhesive layer 5 against the film 6 to obtain the assembly represented in FIG. 4.

Another way to ensure or effect the solidarization or unity between the film 6 and second element 2 may be accomplished in the case where the second element 2 comprises a junction surface 4, formed of thermohardenable or thermo-settable resin that is not entirely cross-linked or reticulated, e.g., a reinforcing element pre-impregnated with resin. In this case, as shown in FIG. 2, one can apply the junction surface 4 of the second element 2 directly against the film 6 and, by heating, the resin of the second element 2, which is not entirely cross-linked or reticulated, effects the adhesion function, the adhesion being obtained by an additional cross-linking of the resin. The resins generally used for this purpose are epoxy, polyester or polyurethane resins.

One can advantageously use a polyetheresteramide film 6, comprising at least about 50% by weight and preferably at least about 60% by weight of polyetheresteramide, and of a maleic ethylene-propylene copolymer (EPR). This embodiment permits, for example, the adhesion by an epoxy adhesive, or a polyester adhesive or a polyurethane adhesive 5 of a first element 1 whose junction surface 3 is composed of at least a material including those selected from the group consisting of polyamide, polyethylene, terephthalate polyethylene, polybutadiene terephthalate, polypropylene, processed aluminum, aluminum alloys, aluminum steel, and metal alloys.

In another example, the use of the film 6 of the present invention permits the adhesion of a first element 1 composed of a polyamide film 11, for example, by an epoxy resin adhesive 5 on a support 2. The element 1 may be advantageously used as an upper decorative element, i.e., a cosmetic layer, or protection element of a ski, in which case, for example, the second element or support 2 may be an element of mechanical reinforcement Including, for example, a woven or non-woven textile reinforcement, made of a material including those selected form the group consisting of fiberglass, carbon, and aramide, or other elements. Alternatively, the second element or support 2 can be a metallic reinforcement element made of a material including those selected from the group consisting of steel, aluminum, and metal alloys.

In the embodiment represented in FIGS. 1–4, the assembly is accomplished in successive steps. The first step is illustrated in FIGS. 1 and 2, during which the film 6 is assembled by a technique selected from the group consisting of calendaring, heat pressing, and coextruston of adhesive 5 on junction surface 3 of the first element 1 that is not compatible for adhesion with adhesive 5. For this embodiment, the temperature must be elevated to the level of the melting point of the film 6. During the second step, the adhesive 5 is applied on the junction surface 4 of the second element 2, as represented in FIG. 3; during a third step, the layers composed of the adhesive 5 and film 6 are applied one against the other, and an assembly, such as represented in FIG. 4, is achieved.

Figure 5:
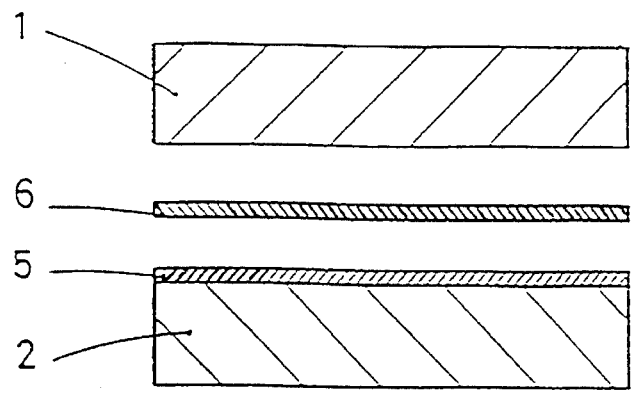
FIGS. 5 and 6 illustrate a process of assembly by adhesion according to another embodiment.
Figure 6:
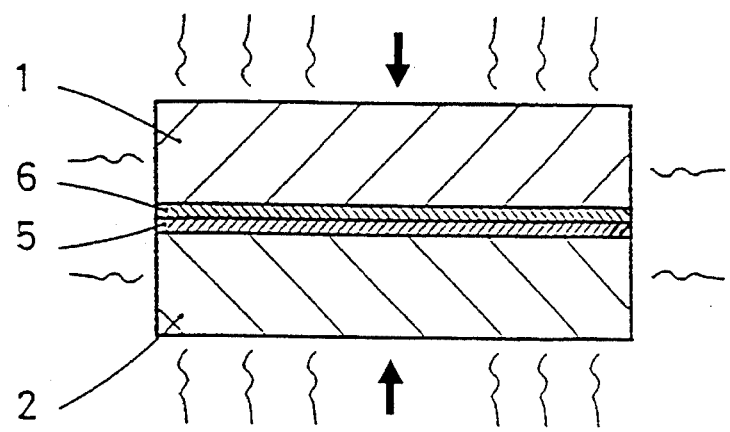

In the embodiment represented in FIGS. 5 and 6, all the elements, films, and adhesive layers are placed in a mold in the following order: a first element 1, a film 6, adhesive layer 5, and a second element 2. By heat pressing, all the elements are applied one against the other, and the assembly is achieved in one step. The temperature of the assembly must again be raised to the level of the melting point of the film.

Figure 7:
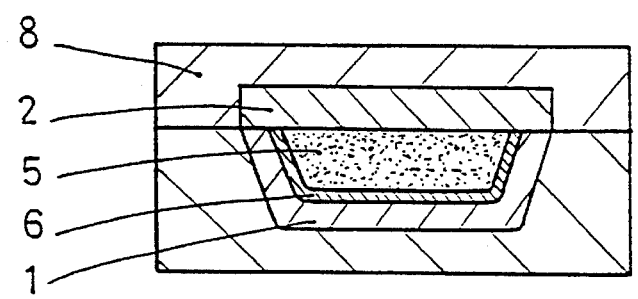
FIGS. 7 and 8 illustrate a process of assembly by adhesion according to other embodiments.

Another embodiment of the invention represented in FIG. 7 involves assembling the elements of the ski structure 1 and 2 by injection of a polyurethane and expandable type of thermohardenable foam 51. The foam 51 is not compatible with all the elements to be assembled. The adhesion is ensured by interspersing a film in accordance with the present invention, i.e., an adhesive film 6, between the foam 5 and the elements 1 and 2 to be glued. A first element 1 of the ski structure, an adhesive film 6, and then a second element 2 have previously been placed in a mold 8. Then, a polyurethane foam 51 is injected into it which, after its expansion and hardening phases, adheres perfectly to the adhesive film 6 and the first element 1. The heat given off by the exothermal reaction is generally sufficient to bring the adhesive film 6 to its melting point and to bring about the adhesion of the elements of the structure; however, one can introduce additional heat after or during the molding operation.

Figure 8:
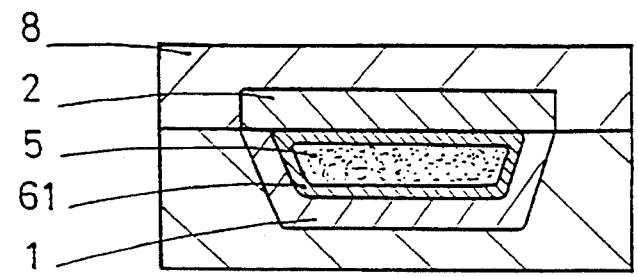

In a similar manner, the adhesive film 6 can be positioned between the foam 51 and the second element 2, when the second element 2 does not have adhesive compatibility or only a weak adhesive compatibility with the foam 51. In this case, the film preferably has the special form of a tubular envelope 61 in which the foam 51 is injected, as is shown in FIG. 8. The tubular envelope 61 has the advantage of assuring impermeability against a possible spill over of the foam 51.

It is understood that the present invention is not limited to the embodiments that lave been explicitly described herein, and its scope includes the diverse processes of gluing elements in other applications in all other fields such as that of automobile equipment, of anti-noise laminates, of thermal insulation, of shoe soles, of isothermic combinations, and the like.

As a further example of the present invention, these adhesive films can be used in the manufacture of foam products covered with fabric according to the known technique of "foam baking". In a first step, a fabric/film complex is manufactured in a lamination machine; the resultant fabric/film comprises at least one layer of fabric and one of film of the present invention and possibly, a layer of foam. The compound thus manufactured is positioned in a mold and a thermohardenable type of foam, preferably of polyurethane, is injected into it. The expansion reaction in situ of the components of the foam brings about the adhesion of the complex.

The following examples illustrate the invention, but are not limiting in nature:

Unless indicated otherwise, in all of the examples that follow, the proportions of the components are given by weight.

EXAMPLE I

In a mono-screw extruder, wherein the speed of the screw is adjusted to 33 trs/mn, 80 parts of polyetheresteramide ($A_1$) and 20 parts of maleic ethylene and polypropylene copolymers ($B^1$) are compounded.

The polyetheresteramide ($A^1$) used is composed of 88% of PA-12 sequences (Mn=1000) and of 12% of sequences of PTMG (Mm=1000).

The extrusion temperature is maintained at a temperature within the range of about 200° C. and 220° C., arid the output of the extruder is fixed to 30 kgs per hours.

When it exits from the dye, the resultant composition is in the shape of rods with an average granularity equal to about 3 mm at a Melt Index (MI) of 1.31 measured at about 190° C. under a load of 2.16 kgs according to the norm ASTM D1238.

The maleic EPR used contains 70% of ethylene. Its total anhydride rate is between about 1.08% and 1.5% and its Melt Index (measured at 230° C. under a load of 10 kg) is equal to 9.

The resultant composition obtained above in this Example I is then extruded into a film under the following extrusion conditions:

extrusion temperature: 184° C./206° C./215° C.

temperature of the channels: 231° C./236 ° C.

temperature of the dye: 228° C./236° C.

The speed of the screw is 80 trs/mn and the speed of the draw-in is 20 m/mn.

At its exit from the dye, the thickness of the film is approximately 50 μm.

EXAMPLE II

In the same conditions as Example I, a Composition II composed of 70 parts of polyetheresteramide ($A_2$) and 30 parts of EPRm ($B_1$) are compounded.

The polyetheresteramide B2 is composed of 88% of PA-12 sequences (Mn=5000) and 12% of sequences of PTMG (Mn-650).

The Composition II is then extruded into a film under conditions that are identical to those described in Example I.

EXAMPLE III

Using the same conditions as in Example I, a Composition III composed of 90 parts of polyetheresteramide ($A_2$) and 10 parts of EPRm ($B_2$) are compounded.

The EPRm ($B_2$) used contains 50% of ethylene. Its total anhydride rate is equal to 1.26% and its Melt Index (measured at 230° C. under a load of 2.16 kg) is equal to 3.

The shore hardness D (5s) of III, measured according to the ISO norm 868, is equal to 60.6.

The tear index in traction, measured according to the norm ASTM D638 is equal to 20.9 MPa.

The module of elasticity in flexion at 20° C., measured according to the norm ASTM D790, is equal to 357 MPa.

Resistance to tear, measured according to the norm ISO 34, (tear parallel to injection) is equal to 147.4 kN/m.

The Composition III is then extruded into a film under the same conditions as those described in Example I.

Although the invention is described with reference to particular means, materials and embodiments, form the foregoing description, one skilled in the art can easily ascertain the essential characteristics of the present invention; and various changes and modifications may be made to various usages and conditions, without departing from the spirit and scope of the invention as described in the claims that follow.

What is claimed is:

1. A film adapted for adhesion, said film having a composition comprising:
   a) at least one polyamide based thermoplastic elastomer selected from the group consisting of polyetheramides and polyetheresteramides: and
   b) at least one olefin copolymer selected from the group consisting of statistical copolymers and sequenced copolymers, said olefin copolymer comprising at least one member selected from the group consisting of:
      i) an olefin copolymer comprising at least two different olefin monomers grafted with a member selected from the group consisting of carboxylic acid, an anhydride of carboxylic acid, and a salt of carboxylic acid, and
      ii) an olefin copolymer comprising at least one comonomer selected from the group consisting of vinylic esters of saturated carboxylic acid, saturated mono-carboxylic acids, saturated di-carboxylic acids, esters of saturated mono-carboxylic acids, esters of saturated di-carboxylic acids, salts of saturated mono-carboxylic acids, salts of saturated di-carboxylic acids, anhydrides of saturated di-carboxylic acids, and anhydrides of unsaturated di-carboxylic acids, wherein said olefin copolymer has an olefin content of at least 50% based on the total weight of said olefin copolymer.

2. The film according to claim 1, wherein said olefin copolymer has an olefin content of at least 60% based on the total weight of said olefin copolymer.

3. The film according to claim 1, wherein the weighted ratio of polyamide based thermoplastic elastomer to polyamide based thermoplastic elastomer and olefin copolymer is greater than about 0.5.

4. The film according to claim 3, wherein said weighted ratio is greater than about 0.6.

5. The film according to claim 1, wherein said olefin copolymer is selected from the group consisting of maleinated ethylene-propylene rubber, and maleinated ethylene-propylene-diene terpolymers.

6. The film according to claim 1, wherein said film further comprises additives selected from the group consisting of pigments, dyes, and up to about 50% by weight of fillers based on the weight of said polyamide based thermoplastic elastomer and modified copolyolefin.

7. The film according to claim 6, wherein said additive comprises fillers present in an amount up to about 40% by weight based on the weight of said polyamide based thermoplastic elastomer and modified copolyolefin.

8. The film according to claim 1, wherein said olefin copolymer comprises at least one member selected from the group consisting of:

a) ethylene-propylene copolymers grafted with a member selected from the group consisting of carboxylic acid, an anhydride of carboxylic acid, and a salt of carboxylic acid, and b) maleinated ethylene-propylene rubber, and maleinated ethylene-propylene-diene terpolymers.

* * * * *